No. 856,394. PATENTED JUNE 11, 1907.
G. F. CONNER.
BEET HARVESTING MACHINE.
APPLICATION FILED MAR. 24, 1905.

4 SHEETS—SHEET 1.

Witnesses:
G. L. Stickney.
C. L. Goodrich

Inventor:
George F. Conner.
by Clement R. Stickney.
Attorney.

No. 856,394. PATENTED JUNE 11, 1907.
G. F. CONNER.
BEET HARVESTING MACHINE.
APPLICATION FILED MAR. 24, 1905.

4 SHEETS—SHEET 2.

No. 856,394. PATENTED JUNE 11, 1907.
G. F. CONNER.
BEET HARVESTING MACHINE.
APPLICATION FILED MAR. 24, 1905.

4 SHEETS—SHEET 3.

Witnesses:
G. H. Stickney.
C. L. Goodrich.

Inventor:
George F. Conner.
by Clement R. Stickney
Attorney.

No. 856,394. PATENTED JUNE 11, 1907.
G. F. CONNER.
BEET HARVESTING MACHINE.
APPLICATION FILED MAR. 24, 1905.
4 SHEETS—SHEET 4.
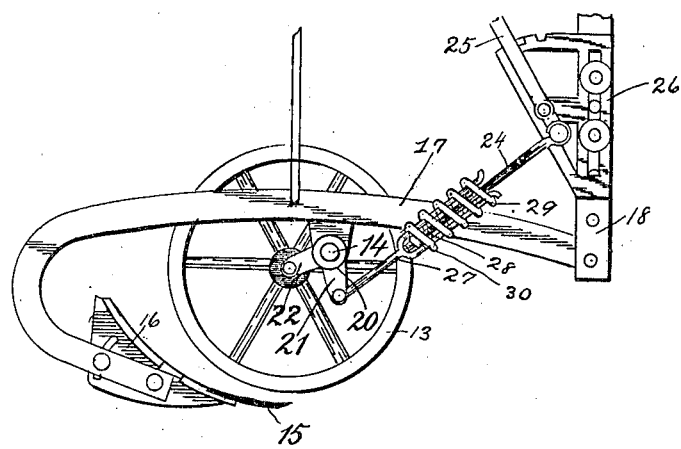
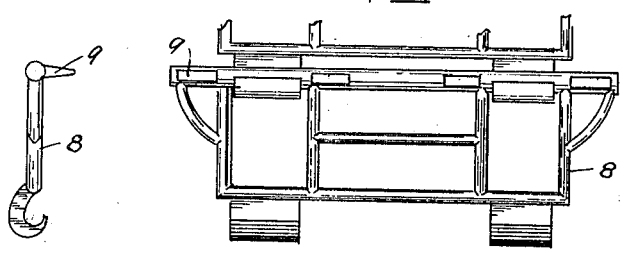
Witnesses:
G. H. Stickney.
C. L. Goodrich.
Inventor:
George F. Conner.
by Clement R. Stickney
Attorney.

UNITED STATES PATENT OFFICE.

GEORGE F. CONNER, OF PORT HURON, MICHIGAN.

BEET-HARVESTING MACHINE.

No. 856,394.    Specification of Letters Patent.    Patented June 11, 1907.

Application filed March 24, 1905. Serial No. 251,904.

*To all whom it may concern:*

Be it known that I, GEORGE F. CONNER, a citizen of the United States of America, and a resident of the city of Port Huron, county of St. Clair, and State of Michigan, have invented certain new and useful Improvements in Beet-Harvesting Machines, of which the following is a full, clear, and exact specification.

This invention relates to beet harvesting machines and especially to means for cutting tops and crowns from beets while the latter are in the ground, and for removing the severed portions to permit the pulling of the beets without clogging or recovering them.

The invention consists in the matters hereinafter set forth, and more particularly pointed out in the appended claims.

Figure 1:
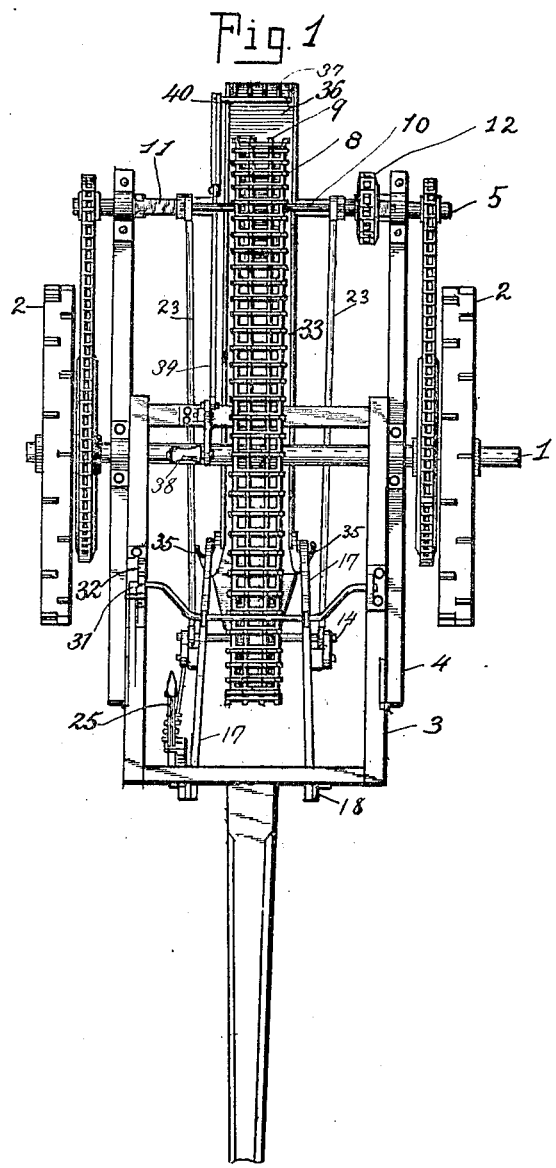
Figure 2:
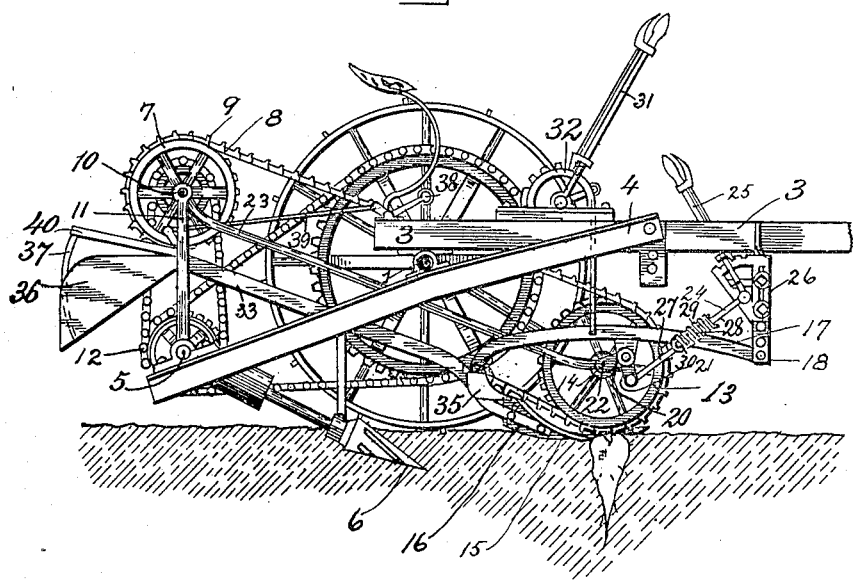
Figure 3:
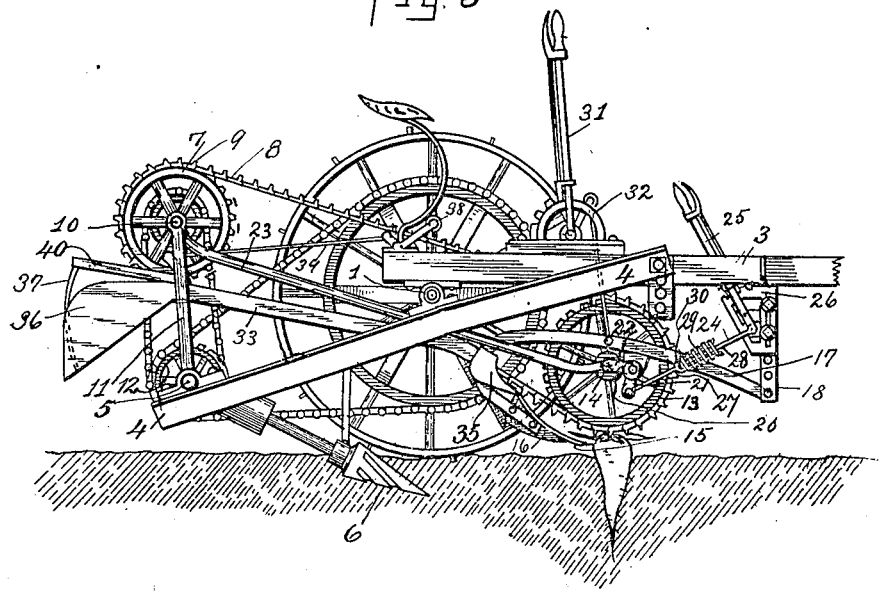
Figure 4:
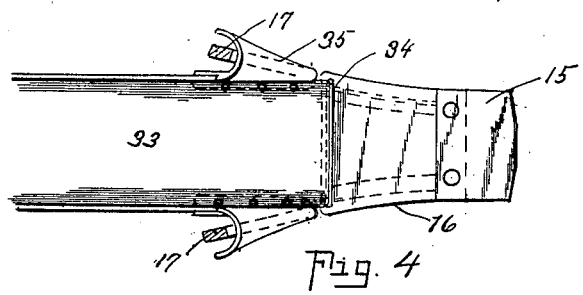
Figure 5:
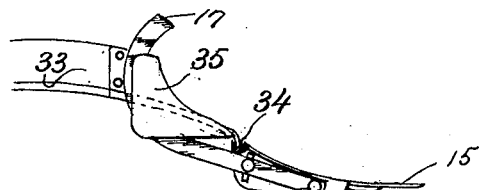

Referring to the drawings, Figure 1 is a plan view of a machine provided with a topping mechanism which embodies the principal features of the invention. Fig. 2 is a view in side elevation of the machine, parts being removed for clearness of view, showing the cutter at the lower point of its range. Fig. 3 is a view in side elevation, showing the cutter at the upper point of its range. Fig. 4 is a view in detail of a knife, cradle and conveyer chute, parts being broken away and in section. Fig. 5 is a view in side elevation of the parts shown in Fig. 4. Fig. 6 is a view in side elevation of a differential mechanism and gauge wheel. Fig. 7 is a plan view of a carrier chain link. Fig. 8 is a view in side elevation of the link.

As herein shown, the topping mechanism is illustrated in connection with a puller of the type and along the general lines of the machine described in the application for beet harvesting machines filed by me on February 2nd., A. D. 1903, Serial No. 141,453, wherein there is a main shaft 1, driven by a pair of traction wheels 2 carrying a horizontal frame 3 and adjustable tilting frame 4, near whose rear, lower end a counter-shaft 5 is journaled. Pulling cones 6 and their driving mechanisms are operatively connected to this shaft 5 in a manner described in said specification and illustrated in a general manner herein, so that the cones 6 may be pulled through the ground astride a beet row. The pulling mechanism does not in itself form a part of this specification and is not claimed *per se* herein. The topping mechanism is mounted on and driven from this machine, although it may be supported and driven by its own traction wheels, or by the mechanism of any preferred type of puller.

Referring more particularly to the topping means, a sprocket wheel 7 capable of carrying a broad sprocket chain 8 having parallel gangs of spuds 9, is secured on a shaft 10 which is journaled in a suitable manner in a suitable, vertically disposed frame 11 parallel to the countershaft 5 and driven therefrom by any preferred means, as by a sprocket and chain 12. The lower end of said sprocket shaft frame 11 is pivoted on or in axial alinement with the countershaft 5 so as to swing in a limited arc without changing the pitch length of the chain 12. A second sprocket wheel 13 corresponding to the sprocket 7 is mounted in alinement therewith on a shaft 14 which is hung from the main frame so as to allow said sprocket wheel 13 to traverse the beet row ahead of the pulling cones 6 and to act as a gauge wheel for a topping knife 15. Said knife 15 is positioned ahead of the pulling cones, with its cutting edge transverse to the beet row, so as to be drawn through the beet tops and crowns by the forward movement of the machine. Said knife, which, as herein shown and as preferably made, is a thin curved blade having a crowned or cambered cutting edge, is supported for the major portion of its length between its ends by a cradle 16 of suitable design to afford the proper backing to the knife, while not obstructing in any way the passing of material over the top or away from both ends of the knife. Said cradle is secured by slotted flanges and bolts, or other preferred and suitable means, to or between the inner ends of a pair of similarly disposed arms 17, which extend back from the cradle to clear the tops, and extend above and forward of the cradle to the front of the machine, where they are pivoted to the lower end of a suitably designed hanger 18. The cradle and knife are thus movable in a vertical arc. A pair of bell crank levers 20 are suitably pivoted to the cradle arms somewhat in advance of the knife and the shaft 14 of the gauge sprocket 13 is secured to the inner or inturned arms 22 of said bell cranks. A pair of suitable links 23 are journaled to said shafts 10 and 14 and hold them in parallel relation, thereby maintaining the two sprocket wheels of the spud or conveyer chain 8 in proper relation. One of the downturned arms 21 of the said bell cranks is pivoted to a link 24 whose outer end is in turn pivotally connected to the lower end of an adjusting lever 25 which works in a suitable quadrant 26. The latter is adjustably secured by bolt and slot connections to the hanger 18 or the main frame so that the link pivot centers may be brought near to the pivot centers of the cradle arms 17. Thus the rise and fall of the sprocket gauge wheel will cause the topping knife to rise and fall, the extent of their relative movements being determined by the lengths of the various parts connecting them, and by the relative positions of their centers of motion. The adjusting lever 25 enables the operator to raise and lower the gauge wheel independently of the cutter. In order that the gauge wheel may snap back from the cutter in case a stone or other hard substance is drawn between them by the chain, the links 24 each comprise a bifurcated rod 27 between whose parallel arms a second rod 28 is secured by an encircling spiral or coiled spring 29, which is confined in compression between suitable stops such as check nuts or cotter pins 30. The link is thus free to lengthen under stress greater than the normal, while the abutting parts of the rod and fork prevent its shortening under compression. The whole topping mechanisms may be raised from the ground by a suitably disposed lifting lever 31 and locking quadrant 32.

While the differential movement of the gauge and knife is preferably obtained by the disposition of parts herein described, it may obviously be gained by any of the mechanical movements in common use for such purposes.

A conveyer chute 33 is secured beneath the spud chain 8 so as to be swept by its lower portion as by a conveyer flight. The rear end of the chute rests on the shaft frame 11 and its lower end is secured to the knife cradle 16 by the lipped or flanged margin of the bed which hooks into a groove 34 in the face of the cradle, so that the latter may be tilted at any angle in its arms and still leave a flush or unbroken surface for the beet tops to pass over. Said chute is crowned for a portion of its length near the cradle, so as to bear positively against the spuds of the chain and thus insure the compression of the beet tops when they first enter the chute. The sides of the chute are each secured at their lower ends, to a shoe 35, which encircles the adjacent portion of the cradle arm and is so proportioned and molded as to present smooth curved surfaces which tend to force the beet tops and leaves to the center of the chute and to compress them.

A hopper 36 is secured to the upper end of the chute, adapted to discharge on one side of the beet row. A gate 37, of any suitable pattern which will retain the tops while allowing the dirt to fall through, is movably secured in the hopper mouth by a lifting lever 40. Said lever may be operated by a foot lever 38 and link 39, or it may be automatically opened by a trip on one of the wheels arranged to engage said lever, or by any other preferred means.

In operation, the machine is drawn along a beet row so that the gauge wheel rides over the beet tops. The operator places the knife at the proper distance from the cutter by the adjusting lever, as determined by the condition of the beets. As the machine advances, the gauge, which is positively driven by the spud chain and other mechanism at a rate of speed equal to or greater than its rolling contact with the ground, and which is practically centered over the edge of the knife, raises and lowers the knife in proportion to the height of the crowns encountered, so that the latter are severed at the proper point. Inasmuch as the beets which project farthest above the ground need the greatest amount of crown removed, the differential connections between the gauge and cutter are arranged and adjusted so that the knife does not rise as high as the gauge wheel, thereby slicing more from the high tops than from the low ones. By shifting the adjusting lever quadrant up and down, this proportionate movement may be varied as the conditions require.

As the knife enters the crown of a beet, the spuds of the conveyer chain engage and hold it, preventing it from breaking off before being cleanly severed, and drawing it back with its leaves into the chute between the shoes and compressing it and sweeping it into the hopper in a compact mass. While the conveyer carrier may be a belt or like flexible article provided with projections on its outer face, the perforated or open link chain shown herein is preferable, as it does not afford support for earth and other foreign substances, which pass through and are readily shaken off. The rigid connection of the spuds and chain, the spuds being integral with the links, also insures their entering and holding the beet crowns firmly while the knife is passing through the latter, and as they are substantially stationary in relation to the beet root, they act as fingers which prevent any breaking of the beet. The beet tops and crowns may be discharged from the hopper as desired, thereby leaving the beets uncovered after they are pulled.

It is obvious that the topping mechanism may be adapted to use with any desired type of puller, or may be operated independently, by being provided with suitable traction wheels and driving mechanism.

The form and design of the parts may be varied without departing from the spirit of the invention, and I do not limit myself to any particular disposition and arrangement of parts except as set forth in certain of the appended claims.

I claim as my invention:—

1. A beet topper comprising a main frame, a pair of cradle arms pivoted at their corresponding ends to the main frame, a knife cradle secured to their free ends, a knife secured to the cradle, a pair of wheel levers pivoted to the cradle arms in alinement, a link pivoted at one end to the wheel levers and at the other to the main frame, and a gauge wheel rotatively secured to the wheel levers.

2. A beet topper comprising a main frame, a pair of similarly disposed cradle arms pivoted at one end to the main frame, a knife cradle secured between the free ends of the levers, a pair of similarly disposed bell cranks pivoted to the cradle arms, a gauge wheel rotatively secured between the corresponding arms of the bell cranks, an adjusting lever pivoted to the main frame, and link and pin connections between the adjusting lever and the other arms of the bell cranks.

3. In a beet topper, a vertically movable knife, a conveyer chute whose receiving end is operatively connected to the knife, a gauge wheel for the knife, and an endless carrier for the chute passing around the gauge wheel, whose lower flight assumes different angular relations to the chute, said chute being longitudinally crowned near its receiving end so that it passes through the path of motion of the flight.

4. In a beet topper, a vertically movable knife, a conveyer whose chute is secured near its mouth to the knife and whose carrier comprises an endless sprocket chain driven by a sprocket near the discharge end of the chute and passing over a sprocket above the knife, said forward sprocket and chain being operatively connected to the knife as a gauge therefor.

5. A beet topper comprising a main frame, a vertically movable knife, a gauge wheel for the knife differentially connected thereto, a conveyer whose delivery end is carried by the main frame and whose receiving end is carried by the knife, and whose flight comprises an endless carrier running over and driving the gauge wheel, and means for maintaining a constant tension on the flight in all positions assumed by the carrier.

6. A beet topper comprising a main frame, a vertically movable knife, therein, a gauge wheel for the knife differentially connected thereto, and a conveyer whose flight comprises an endless carrier running over and driving the gauge wheel, the delivery end of the conveyer being supported by the main frame and the receiving end by the knife, and a drive wheel for the carrier movably supported in fixed relation to the gauge wheel.

7. A beet topper comprising a main frame, a vertically movable knife therein, a gauge wheel differentially connected to the knife, a conveyer whose receiving end is operatively connected to and moves with the knife and whose flight comprises an endless carrier driving the gauge wheel and having the differential vertical movements of the gauge wheel in relation to the knife, and means articulating the carrier driving mechanism and the discharge end of the conveyer to the main frame and maintaining the driving mechanism and gauge wheel in fixed relation.

8. A beet topper comprising a main frame, a vertically movable knife therein, and a conveyer articulated at its rear end to the main frame, whose flight comprises an endless carrier passing over and acting as gauge for the knife, differentially connected thereto, the receiving end of the conveyer being carried by the knife.

9. A beet topper comprising a main frame, a vertically movable knife therein a gauge wheel for the knife, a conveyer whose chute moves vertically with the knife and whose flight moves vertically with and drives the gauge wheel, and a frame carrying the rear sprocket of the flight and the discharge end of the conveyer, oscillatory in the main frame.

10. A beet topper comprising a main frame, a topper frame pivoted at its forward end to the main frame, a knife secured in the free, rear end of the topper frame, a conveyer whose chute is carried at its forward end by the topper frame and at its rear end by the main frame, and whose flight comprises an endless carrier sweeping the chute whose forward sprocket is journaled in the topper frame, and acts as a gauge for the knife.

11. A beet topper comprising a main frame, a topper frame whose forward end is pivoted to the main frame, a knife secured in the free, rear end of the topper frame, a conveyer whose chute is articulated at the rear end to the main frame and whose forward end is carried by the free end of the topper frame, and whose flight comprises an endless carrier sweeping the chute, whose rear wheel is journaled on the main frame and whose forward wheel is journaled in the topper frame, and acts as a gauge for the knife.

12. A beet topper comprising a main frame, a topper frame pivoted at its forward end to the main frame a knife secured in the free, rear end of the topper frame, a conveyer whose chute is carried at its forward end by the topper frame and at its rear end by the main frame, and whose flight comprises an endless carrier sweeping the chute whose forward wheel is journaled in differential connections with the topper frame, and acts as a gauge for the knife.

13. A beet topper comprising a main frame, a topper frame pivoted at its forward end to the main frame, a knife secured in the rear free end of the topper frame, a conveyer frame oscillatory in the main frame, a conveyer chute whose forward end is supported by the topper frame and whose rear end is articulated to the conveyer frame, and an endless carrier sweeping the chute, whose forward end carries the free end of the topper frame and acts as a gauge for the knife, and whose rear wheel is journaled in the conveyer frame.

14. A beet topper comprising a main frame, a topper frame pivoted at its forward end to the main frame, a knife fixed in the topper frame, a conveyer frame pivoted at one end to the main frame, a conveyer chute carried at its forward end by the free end of the topper frame and at its rear end by the free end of the conveyer frame, an endless carrier sweeping the chute whose forward wheel shaft is journaled in bearings yieldingly secured on the free end of the topper frame, and whose forward wheel acts as a support for the free end of the topper frame and as a gauge for the knife, and whose rear wheel shaft is journaled in the free end of the conveyer frame, and links pivoted at each end to the forward and rear carrier wheel shafts.

15. In a beet topper, a vertically movable knife and a conveyer whose endless carrier is differentially connected to and acts as a gauge for the knife.

16. In a beet topper having a topping frame and a knife secured therein, a gauge secured by lever connections to the topping frame, and a spring-pressed, yielding link connecting the gauge levers and main frame, and affording yielding relation between the gauge and knife.

17. In a beet topper, a vertically movable knife, a gauge therefor, differential connections between the gauge and knife controlling their relative vertical movements, a conveyer chute moving vertically with the knife and a conveyer flight sweeping the chute, moving vertically with the gauge, said chute being adapted to co-operate with the flight throughout the range of their relative movements.

18. A beet topper comprising a vertically movable knife, a gauge therefor, and connections affording differential vertical movement in the knife and gauge, yieldingly maintaining them in operative relation to each other.

19. In a beet topper, a vertically movable knife, a gauge therefor, differential connections between the gauge and knife and a spring in the differential connections permitting limited movement of the gauge independent of the movement of the knife.

20. A beet topper comprising a main frame, a topper frame oscillatory therein, a knife secured in the topper frame, a gauge for the knife swinging in and supporting the free end of the topper frame, a link pivoted at one end to a lever adjustably locked with the main frame and at the other end to the gauge, and a spring in the link permitting limited movement of the gauge in the topper frame.

21. A beet topper comprising a main frame, a topper frame swinging therefrom, a knife secured in the free end of the topper frame, a pair of levers swinging in alinement in the topper frame, a gauge for the knife mounted on the levers, a link pivoted at one end to the gauge levers, and at the other articulated to the main frame, and an adjustably secured lever on the main frame for rocking the gauge levers on the topper frame.

22. A beet topper comprising a main frame, a knife vertically movable in relation to the main frame, a gauge for the knife, differential connections between the gauge and knife controlling their relative vertical movements, and an adjustably secured lever on the main frame for setting the knife.

23. A beet topper comprising a main frame, a topper frame pivoted at its forward end to the main frame, a knife secured in the rear, free end of the topping frame, a conveyer whose chute is carried at its forward end by the topper frame and at its rear end by the main frame, and whose flight comprises an endless carrier sweeping the chute whose forward sprocket is journaled in the topper frame and acts as a gauge for the knife, the sides of the chute at its receiving end being outwardly curved to form lateral top-compressing means.

24. A beet topper comprising a main frame, a vertically movable knife therein, a positively driven gauge for the knife, coacting therewith to shear off beet crowns passing between them, and differential connections between the knife and the gauge yieldingly maintaining them in operative relation.

25. A beet topper comprising a main frame, a topper frame vertically movable therein, a knife rigidly secured in the topper frame, a rotatable gauge whose bearings swing in a vertical arc centered in the topper frame, a link articulated to the bearings, controlling motion in their arc, and a lever pivoted to the link, adjustably interlocked with the main frame, adapted to shift the center of rotation of the link.

26. In a beet topper, a vertically movable knife, a sprocket wheel resting on the ground in advance of the knife, and carrying the knife, and a conveyer whose carrier consists of a sprocket chain passing over the sprocket wheel and between the wheel and the knife and driving the wheel.

27. A beet topper comprising a main frame, a vertically movable knife therein, a gauge for the knife, differential connections between the knife and gauge controlling their relative vertical movements, and adjusting means for varying the ratio of the respective movements of the knife and gauge.

28. A beet topper comprising a vertically movable knife, a gauge therefor, connections affording differential vertical movements in the knife and gauge, yieldingly maintaining them in operative relation to each other, and adjusting means for varying the ratio of the respective movements of the gauge and knife.

29. A beet topper comprising a main frame, a topper frame movable therein, a knife in the topper frame, a gauge for the knife, connections between the frames, the knife and gauge affording differential vertical movements in the knife and gauge, yieldingly maintaining them in operative relation, and adjusting means for varying the ratio of the differential movements of the knife and gauge.

30. A beet topper comprising a main frame, a vertically movable knife therein, a positively driven gauge for the knife, coacting therewith to shear off beet crowns passing between them, and connections between the gauge and the knife, yieldingly maintaining them in operative relation.

In testimony whereof, I have hereunto set my hand in the presence of the subscribing witnesses, this 7th day of January, A. D. 1905.

GEORGE F. CONNER.

Witnesses:
D. E. PURDY,
BURNETTE F. STEPHENSON.